(12) United States Patent
Liu et al.

(10) Patent No.: US 7,161,286 B2
(45) Date of Patent: *Jan. 9, 2007

(54) CARBON NANOTUBE ARRAY AND METHOD FOR MAKING SAME

(75) Inventors: Liang Liu, Beijing (CN); Shou-Shan Fan, Beijing (CN)

(73) Assignees: Tsinghua University, Beijing (CN); Hon Hai Precision Ind. Co., Ltd., Tu-Cheng (TW)

( * ) Notice: Subject to any disclaimer, the term of this patent is extended or adjusted under 35 U.S.C. 154(b) by 430 days.

This patent is subject to a terminal disclaimer.

(21) Appl. No.: 10/640,340

(22) Filed: Aug. 12, 2003

(65) Prior Publication Data

US 2004/0109815 A1    Jun. 10, 2004

(30) Foreign Application Priority Data

Dec. 5, 2002    (CN)    ................................. 02 1 52193

(51) Int. Cl.
*H01J 1/05*    (2006.01)
*D01F 9/12*    (2006.01)

(52) U.S. Cl. ................. 313/311; 423/447.2; 423/447.3; 977/742; 977/850; 313/346 R

(58) Field of Classification Search ............. 423/447.3; 977/750, 844
See application file for complete search history.

(56) References Cited

U.S. PATENT DOCUMENTS 5,653,951 A * 8/1997 Rodriguez et al. .......... 423/439

6,232,706 B1 * 5/2001 Dai et al. .................... 313/309

OTHER PUBLICATIONS

Yao, B. D. and Wang, N., "Carbon Nanotube Arrays Prepared by MWCVD," 2001, American Chemical Society, Journal of Physical Chemistry, 105, pp. 11395-11398.*
Fan S. S. et al. "Self-oriented Regular of Carbon Nanotubes and Their Field Emission Properties" Science, Jan. 22, 1999, vol. 283, pp. 512-514.
B. Q. Wei et al. "Organized Assembly of Carbon nanotubes" Nature Apr. 4, 2002, vol. 216, pp. 495-496.
Yue-gang Zhang et al. "Electric-field-directed Growth of Aligned Single-walled carbon nanotubes" Applied Physics Letters, Nov. 5, 2001, vol. 79, No. 19.

* cited by examiner

*Primary Examiner*—Stuart L. Hendrickson
*Assistant Examiner*—Rebecca M. Stadler
(74) *Attorney, Agent, or Firm*—Wei Te Chung

(57) ABSTRACT

A carbon nanotube-based device (40) includes a substrate (10), a number of catalytic nano-sized particles (131) formed on the substrate, and an aligned carbon nanotube array (15) extending from the alloy catalytic nano-sized particles. The aligned carbon nanotube array progressively bends in a predetermined direction. A method for making the carbon nanotube-based device includes the steps of: providing a substrate; depositing a layer of catalyst on the substrate; depositing a layer of catalyst dopant material on the catalyst layer, for varying a reaction rate of synthesis of the aligned carbon nanotube array; annealing the catalyst and the catalyst dopant material in an oxygen-containing gas at a low temperature; and exposing the nano-sized particles and catalyst dopant material to a carbon-containing source gas at a predetermined temperature such that the aligned carbon nanotube array grows from the substrate.

8 Claims, 1 Drawing Sheet

CARBON NANOTUBE ARRAY AND METHOD FOR MAKING SAME

BACKGROUND OF THE INVENTION

1. Field of the Invention

The present invention relates to carbon nanotube-based devices and methods for making such devices. The application relates to a contemporaneously filed application titled "CARBON NANOTUBE-BASED DEVICE AND METHOD FOR MAKING THE SAME" and having the same applicants and the same assignee with the instant application.

2. Description of Related Art

Carbon nanotubes have electrical conductance relate to their structure and chemically stable. Carbon nanotubes typically have very small diameters (less than 100 nanometers) and large aspect ratios (length/diameter). Due to these and other properties, it has been suggested that carbon nanotubes will play an important role in fields such as nano-scale integrate circuits, field emission, and single electronic components such as single electronic transistors. Recently, some electronic components based on a single carbon nanotube have been made in laboratories, such components including a field effect transistor, a logic circuit and a memory. The characteristics of these components are being actively researched. For example, a nanotube transistor is reported in an article by Sander J Tans et al. entitled "Room-temperature transistor based on a single carbon nanotube" (Nature 393–49, 1998). However, synthesis of large amounts of carbon nanotubes having practical applications depends in large part on manufacturing techniques developed using a bottom-up approach.

Manufacturing techniques using the bottom-up approach can control the position, direction, and size of carbon nanotubes. Desired configurations for target nano-scale components can be obtained using relatively few and relatively economical formation steps. A method of controlling the position of carbon nanotube growth by distributing a patterned catalyst is reported in an article by Fan S. S. et al. entitled "Self-oriented regular [sic] of carbon nanotubes and their field emission properties" (Science Vol. 283, pp.512–514, Jan. 22, 1999). In said method, the obtained carbon nanotubes extend perpendicularly to a plane of a substrate.

In addition, a method for controlling the growth of aligned nanotubes in several directions in a single process is reported by B. Q. Wei et al. in an article entitled "Organized assembly of carbon nanotubes" (Nature Vol. 416, pp. 495–496, Apr. 4, 2002).

However, in all the above-mentioned methods, it is not possible to properly control a direction in which the aligned nanotubes extend.

A method to control the direction of single-walled carbon nanotube growth is reported in an article by Yue-gang Zhang et al. entitled "Electric-field-directed growth of aligned single-walled carbon nanotubes" (Applied Physics Letters, Vol. 79, Number 19, Nov. 5, 2001).

However, Zhang et al. method was a wide area control, all the carbon nanotubes in a particular region tend to growth in the same direction as that of the electric field. It is difficult to realize localized and versatile direction control by any external field like an electric field. This limits the diversified design of carbon nanotube-based structures.

SUMMARY OF THE INVENTION

Accordingly, an object of the present invention is to provide a carbon nanotube-based device having an aligned carbon nanotube array that progressively bends in a predetermined direction.

Another object of the present invention is to provide a method for localized control of nanotube array's orientation and bending.

Another object of the present invention is to provide a method for making a carbon nanotube-based device having an aligned carbon nanotube array that progressively bends in a predetermined direction.

In order to achieve the objects set out above, the present invention provides a method for making a carbon nanotube-based device. The method is able to control a direction of growth of a carbon nanotube array, and comprises the steps of: (1) providing a substrate; (2) depositing a layer of catalyst on the substrate; (3) depositing a layer of catalyst dopant material on the catalyst layer, for varying a reaction rate of synthesis of an aligned carbon nanotube array; (4) annealing the catalyst and the catalyst dopant material in an oxygen-containing gas at a low temperature; and (5) exposing the nano-sized particles and catalyst dopant material to a carbon-containing source gas at a predetermined temperature such that the aligned carbon nanotube array grows from the substrate.

Other objects, advantages and novel features of the present invention will become more apparent from the following detailed description and claims, and from the accompanying drawings, in which:

DETAILED DESCRIPTION OF PREFERRED EMBODIMENT OF THE INVENTION

Reference will now be made to the drawings to describe the present invention in detail.

Figure 1:
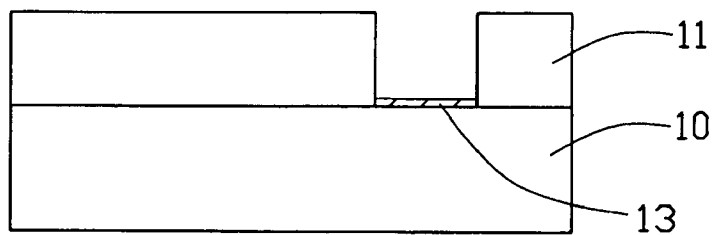
FIG. 1 is a schematic side elevation view of a substrate with a catalyst layer deposited thereon, in accordance with a preferred method of the present invention for making a carbon nanotube-based device.
Figure 2:
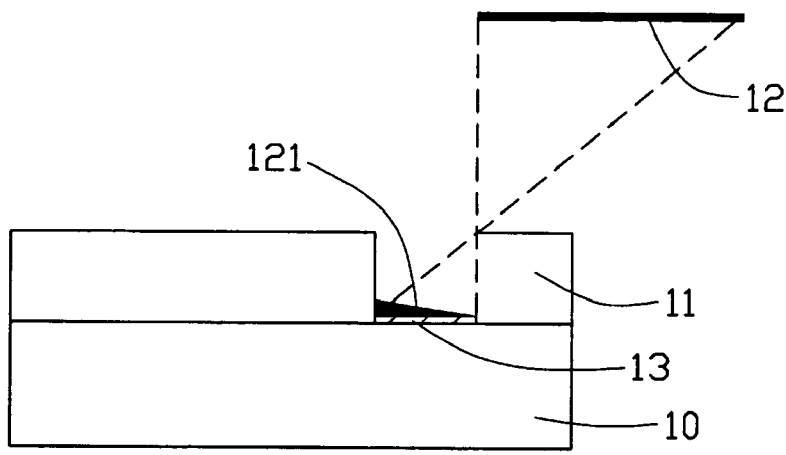
FIG. 2 is similar to FIG. 1, but showing a catalyst dopant material layer being deposited on the catalyst layer in accordance with said preferred method.
Figure 3:
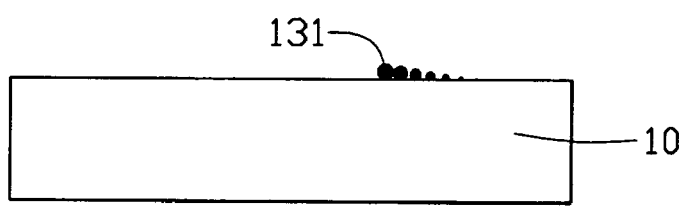
FIG. 3 is similar to FIG. 2, but showing the treated substrate after annealing, heating and exposure to protective and carbon-containing source gases in accordance with said preferred method, wherein the catalyst dopant material and the catalyst have changed into alloy catalytic nano-sized particles.
Figure 4:
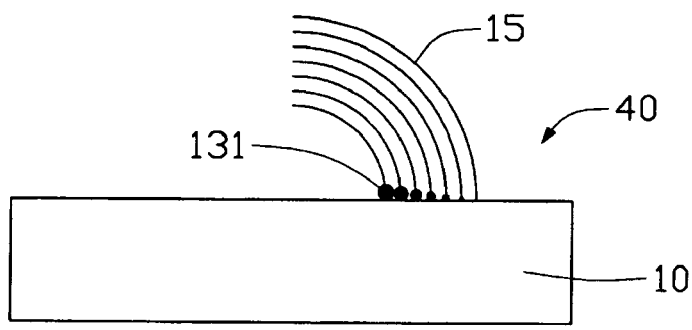
FIG. 4 is similar to FIG. 3, but showing aligned carbon nanotubes formed from the alloy catalytic nano-sized particles in accordance with said preferred method.

Referring to FIG. 4, a carbon nanotube-based device 40 in accordance with a preferred embodiment of the present invention comprises a substrate 10, a plurality of alloy catalytic nano-sized particles 131 formed on the substrate 10, and an aligned carbon nanotube array 15 extending from the alloy catalytic nano-sized particles 131. The aligned carbon nanotube array 15 progressively bends in a predetermined direction.

Referring to FIGS. 1–4, a preferred method of the present invention for making the carbon nanotube-based device 40 is as follows:

First, a substrate 10 is provided, which may be selected from the group consisting of silicon, quartz and glass. A photo-resist layer 11 is formed on the substrate 10. A catalyst layer 13 is deposited on the substrate 10 by electron-beam (e-beam) evaporation or thermal evaporation. The catalyst layer 13 must have a uniform thickness, preferably in the range from 2 nanometers to 10 nanometers. A material of the catalyst layer 13 can be selected from the group consisting of iron, cobalt, nickel, or any suitable combination alloy thereof. In the preferred method, iron is selected as the material of the catalyst layer 13, and is deposited on the surface of the substrate 10 to a uniform thickness of 6 nanometers.

A catalyst dopant material layer 121 is then deposited on the catalyst layer 13. A linear evaporation source 12 is disposed above the photo-resist layer 11. An end of the linear evaporation source 12 and an inner surface (not labeled) of the photo-resist layer 11 share a common vertical plane. The catalyst dopant material layer 121 is deposited on the catalyst layer 13 by thermal evaporation. The thickness of the catalyst dopant material layer 121 is preferably in the range from zero to 10 nanometers, and gradually decreases along a given direction.

The catalyst dopant material layer 121 is capable of varying reaction rates of synthesis of carbon nanotubes. A content of catalyst dopant material in the catalyst dopant material layer 121 determines a particular reaction rate of synthesis of carbon nanotubes. In the preferred method, the catalyst dopant material is copper, which is capable of providing a decreased reaction rate of synthesis of carbon nanotubes.

Alternatively, the liner evaporation source 12 may be substituted by a point evaporation source that moves along a pre-defined line. Furthermore, the above-described method of depositing the catalyst dopant material layer 121 may alternatively employ other techniques such as e-beam evaporation. Moreover, the catalyst dopant material can be selected from group of cobalt, nickel, molybdenum, ruthenium, manganese or a combination of the materials thereof.

The treated substrate 10 is then annealed in an oxygen-containing gas at a low temperature for 10 hours until the catalyst layer 13 is oxidized and changed into separate nano-sized particles (not shown). Preferably, said low temperature is in the range from 200° C. to 400° C. The treated substrate 10 is then placed in a furnace (not shown). The furnace is heated up to a predetermined temperature in a flowing protective gas. The predetermined temperature may vary according to the type of catalyst layer 13 used. In the preferred method, iron is used as the catalyst layer 131 and the predetermined temperature is in the range from 600° C. to 700° C. The protective gas can be selected from the group consisting of noble gases and nitrogen. Preferably, argon is used as the protective gas. A carbon source gas is then introduced into the furnace. In the preferred method, acetylene is used as the carbon source gas. From the time the carbon source gas is introduced, the separate nano-sized particles and the catalyst dopant material layer 121 cooperatively form the alloy catalytic nano-sized particles 131, and the aligned carbon nanotube array 15 grows front the alloy catalytic nano-sized particles 131.

The alloy catalytic nano-sized particles 131 are larger at a region corresponding to the thick end of the catalyst dopant material layer 121, said thick end having a higher content of the catalyst dopant material. Correspondingly, the alloy catalytic nano-sized particles 131 are smaller at a region corresponding to the thin end of the catalyst dopant material layer 121, said thin end having a lower content of the catalyst dopant material. A change in the content of the alloy catalytic nano-sized particles 131 is gradual from said region corresponding to said thick end to said region corresponding to said thin end.

Accordingly, respective growth rates of carbon nanotube from the alloy catalytic nano-sized particles 131 gradually increase from said region corresponding to said thick end through to said region corresponding to said thin end. Thus the aligned carbon nanotube array 15 extending from the alloy catalytic nano-sized particles 131 gradually bends toward said region corresponding to said thick end, due to van der Waals forces acting between the neighboring carbon nanotubes.

It will be apparent to those having ordinary skill in the field of the present invention that the above-described order of deposition of the catalyst layer 13 and the catalyst dopant material layer 121 may be reversed. If this is done, the aligned carbon nanotube array 15 with progressive bending in the predetermined direction is still attained.

It will be further apparent to those having ordinary skill in the field of the present invention: that the acetylene gas may be substituted with methane, ethane or another similar hydrocarbon gas; that the argon gas may be substituted with nitrogen, helium or another similar protective gas; and that the catalyst layer 13 of iron may be substituted with cobalt, nickel, molybdenum, ruthenium, manganese, or a combination or alloy thereof.

The aligned carbon nanotube array 15 of the present invention can be used in applications such as flat panel displays, nano-electronics, and cathode electron guns having high field current emission.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A carbon nanotube-based device comprising:
   a substrate;
   a plurality of alloy catalytic nano-sized particles formed on the substrate, said alloy catalytic nano-sized particles each comprising a catalyst material and a catalyst dopant material, a content of said catalyst dopant material gradually one of increasing and decreasing along a predetermined direction on said substrate; and
   an aligned carbon nanotube array extending from the alloy catalytic nano-sized particles and progressively bending in another predetermined direction on said substrate.

2. The carbon nanotube-based device as claimed in claim 1, wherein the substrate comprises silicon, quartz or glass.

3. The carbon nanotube-based device as claimed in claim 1, wherein the catalyst material is selected from the group consisting of iron, cobalt, nickel, molybdenum, ruthenium, manganese, and any suitable combination alloy thereof.

4. The carbon nanotube-based device as claimed in claim 1, wherein the catalyst dopant material comprises copper, molybdenum, or a combination of copper and molybdenum.

5. A carbon nanotube-based device comprising:

a substrate;

a plurality of alloy catalytic nano-sized particles formed on the substrate, said alloy catalytic nano-sized particles each comprise a catalyst material and a catalyst dopant material, a content of said catalyst dopant material one of increasing and decreasing along a direction on said substrate; and an aligned carbon nanotube array respectively extending from the alloy catalytic nano-sized particles with gradually respective one of increasing lengths and decreasing Lengths of said carbon nanotubes of the carbon nanotube array arranged along said direction on said substrate.

6. A carbon nanotube-based device comprising:

a substrate;

a plurality of alloy catalytic nano-sized particles formed on the substrate, said alloy catalytic nano-sized particles each comprising a catalyst material and a catalyst dopant material, said catalyst dopant material being in a form of a layer, said layer one of thickening and thinning along a predetermined direction on said substrate; and an aligned carbon nanotube array extending from the alloy catalytic nano-sized particles and progressively bending in another direction on said substrate.

7. The carbon nanotube-based device as claimed in claim 6, wherein the catalyst material is comprised of at least one material selected from the group consisting of iron, cobalt, nickel, molybdenum, ruthenium, and manganese.

8. The carbon nanotube-based device as claimed in claim 6, wherein the catalyst dopant material comprises at least one of copper and molybdenum.

* * * * *